United States Patent Office 3,536,691
Patented Oct. 27, 1970

3,536,691
ALLYLTIN COMPOUNDS AS MODIFIERS FOR HALOARYLLITHIUM INITIATED POLYMERIZATIONS OF ISOPRENE OR BUTADIENE
William J. Trepka and Richard J. Sonnenfeld, Bartlesville, Okla., assignors to Phillips Petroleum Company, a corporation of Delaware
No Drawing. Continuation-in-part of application Ser. No. 634,454, Apr. 28, 1967. This application Apr. 14, 1969, Ser. No. 816,118
The portion of the term of the patent subsequent to June 17, 1986, has been disclaimed
Int. Cl. B08f 3/16; C08d 3/08, 3/12
U.S. Cl. 260—94.2          9 Claims

ABSTRACT OF THE DISCLOSURE

An improved processable polyisoprene or polybutadiene with good physical properties is prepared by the delayed addition of an allyltin compound to a haloaryllithium initiated isoprene or butadiene polymerization.

---

This application is a continuation-in-part of our copending application Ser. No. 634,454, filed Apr. 28, 1967, now U.S. Pat. No. 3,450,685.

This invention relates to a novel process for the polymerization of isoprene or butadiene. In another aspect, this invention relates to a process for preparing improved polyisoprene or polybutadiene, especially polyisoprene or polybutadiene containing a high percentage of cis-1,4-addition product, with good physical properties. In still another aspect, this invention further relates to a process for producing tailor-made cis-polyisoprene or cis-polybutadiene having a controlled ratio of high and low molecular weight fractions.

It has now been discovered that an improved processable polyisoprene or polybutadiene with good physical properties can be prepared by the addition of an allyltin compound to a haloaryllithium initiated isoprene or butadiene polymerization if the allyltin compound is added when 25 to 80 percent conversion of the total monomer to polymer is achieved.

Accordingly, it is an object of this invention to provide a process for the polymerization of isoprene or butadiene. It is another object of this invention to provide an improved process for preparing improved processable polyisoprene or polybutadiene. It is another object of this invention to provide an improved polyisoprene or polybutadiene having improved mill banding and extrusion ratings. It is still another object of this invention to provide a process for producing a tailor-made cis-polyisoprene or cis-polybutadiene possessing a selected molecular weight range.

These and other objects and advantages of the invention will become apparent to those skilled in the art upon consideration of the following disclosure, discussion, and the appended claims.

According to this invention an allyltin compound is employed as a modifier for improving the processability of polyisoprene or polybutadiene prepared with haloaryllithium initiators. The allyltin modifier is added in an amount to provide from about 0.005 to 5.0, preferably 0.025 to 1.25 gram millimoles per 100 grams of monomer charged to the polymerization system (mhm.). The allyltin modifier is added when 25 to 80 percent conversion of isoprene or butadiene to polymer has been achieved. Addition of the allyltin compound prior to at least 25 percent monomer conversion or subsequent to 80 percent monomer conversion does not result in the highest improvement in the processability of the polymer. Initial allyltin compound addition does decrease the polymers inherent viscosity but the necessary improvement in processing is not obtained. Addition of the allyltin compound subsequent to about 80 percent conversion of the monomer also does not result in the most desired modifications. It is only when the allyltin compound is added according to this invention that a polymer with improved mill banding and extrusion ratings is achieved. The polymers produced according to this invention still retain the good physical properties, such as tensile, hot tensile, and gum tensile, that are generally associated with polymer production by haloaryllithium initiation of isoprene or butadiene.

The advantages of this invention can be achieved in a batch polymerization process. Another method for obtaining the improved processable high cis-polyisoprene or cis-polybutadiene according to this invention is to employ two continuous reactors operating in series. Tailor-made cis-polyisoprene or cis-polybutadiene with a controlled ratio of high and low molecular weight fractions can thus be obtained. The isoprene or butadiene, solvent, and haloaryllithium initiator can be fed to the first reactor. By manipulating the ratio of catalyst to monomer the average molecular weight of the polymer fraction produced therein can be controlled. The temperature in the first reactor can be manipulated to control the amount of monomer conversion and consequently the amount of polymer produced as the first polymer fraction. The reaction mixture in the first reactor is removed and blended with the allyltin compound modifier and polymerization is continued to provide the improved processing characteristics. The percentage of polymerization permitted in the first reactor is within the preferred range of 25 to 80 percent conversion of the monomer. This blend containing the modifier is then passed to a second reactor wherein the average molecular weight of the polymer fraction produced therein is controlled by the amount of the remaining haloaryllithium initiator and the amount of the allyltin compound modifier that is added. The monomer conversion in the second reactor is controlled by temperature in the second reactor and the length of time polymerization is allowed to continue. The percentage of polymerization permitted after the addition of the allyltin compound modifier is at least about 5 percent conversion of the monomer, and preferably at least an additional 10 percent monomer conversion.

In either process, i.e., the batch or series of reactors, sufficient allyltin compound must be charged to insure that the polymer produced after such charging will be of sufficient low average molecular weight as compared to the polymer produced before said charging in order to effect the production of a polymer having a high cis content and the marked improved processing characteristics. The optimum amount of modifier charged in each case will depend on the particular modifier employed, the degree of polymerization that preceded the charging of the modifier, the initiator employed, and other similar factors. The manner in which the modifier can be charged can vary considerably within the scope of our invention. A polymerization system using the haloaryllithium initiators can be modified by the addition of a small amount of allyltin compound modifier of this invention, i.e., sufficient to maintain the cis content of the polymer produced but not sufficient to significantly lower the molecular weight of the polymer, and subsequently charged with a proportionally greater amount of additional allyltin compound modifier than present in the system and optionally more haloaryllithium initiator to effect the production of a polymer of a high cis content and marked improved processing characteristics. Other variations in charge procedure can be employed according to this invention.

The allyltin compounds that can be employed as modifiers according to this invention can be represented by the following general formula:

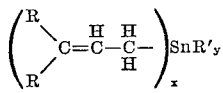

wherein $x$ is an integer from 1 to 4, wherein the sum of $y$ and $x$ equals 4, wherein R is hydrogen or an alkyl or cycloalkyl hydrocarbon radical containing 1 to 6 carbon atoms, and wherein R' is an alkyl, cycloalkyl, or aryl hydrocarbon radical containing 1 to 12 carbon atoms. The aryl hydrocarbon radicals are preferred for R'.

Examplary allytin compounds are tetraallyltin; triallylphenyltin; diallyldiphenyltin; allyltriphenyltin; (3-hexyl-2-nonenyl)tricyclododecyltin; (3,3-dicyclohexyl-2-propenyl)tri(2-naphthyl)tin; di(3,3-dicyclohexyl-2-propenyl)didodecyltin; tri(2-butenyl)cyclopentyltin; tri(3,3-dicyclopentyl-2-propenyl)phenyltin; di(3-methyl-2-butenyl)dimethyltin; 2-butenyltriphenyltin; tetra(3,3-dicyclohexyl-2-propenyl)tin; tetra(2-butenyl)tin; and the like.

According to this invention the haloaryllithium compounds that can be employed as polymerization initiators are 3-halophenyllithium compounds, 1-halo-3-naphthyllithium compounds, and 3-halo-1-naphthyllithium compounds. 4-halophenyllithium compounds and 4-halonaphthyllithium compounds which have been milled can also be employed according to this invention.

The haloaryllithium compounds can be represented by any one of the following formulas:

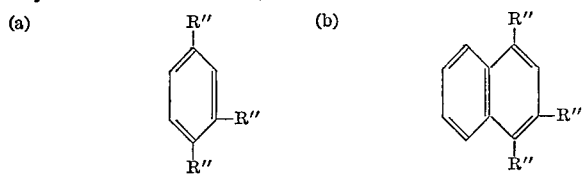

wherein each R" is hydrogen, lithium, or a halogen, said halogen selected from fluorine, bromine, or chlorine and wherein each R" is different from each other R" and only one R" is a halogen; or (c) mixtures of (a) and (b).

As hereinbefore stated the 4-halonaphthyllithium compounds and 4-halophenyllithium compounds which have been milled, such as by ball milling, etc., can be employed according to this invention. The milling of these compounds increases their overall effectiveness. The various milling procedures, conditions, techniques, and advantages of said milling are thoroughly described in copending application, Ser. No. 772,865, William J. Trepka et al., filed Nov. 1, 1968.

Exemplary haloaryllithium compounds are 3-bromophenyllithium; 3-bromo-1-naphthyllithium; 3-chlorophenyllithium; 3-chloro-1-naphthyllithium; 3-fluorophenyllithium; 3-fluoro-1-naphthyllithium; 1-chloro-3-naphthyllithium; 1-fluoro-3-naphthyllithium; 1-bromo-3-naphthyllithium; 4-bromophenyllithium; 4-bromonaphthyllithium; 4-chloronaphthyllithium; 4-chloronaphthyllithium; 4-fluorophenyllithium; 4-fluoronaphthyllithium; 4-bromonaphthyllithium; and mixtures of the foregoing compounds, and the like.

Haloaryllithium compounds employed in this invention can be prepared by any method desired. U.S. Pat. 3,215,679, issued to Trepka, Nov. 2, 1965, discloses suitable procedures.

The process of this invention can be carried out in conventional equipment under conventional conditions. The amount of haloaryllithium initiator employed can vary depending upon the initiator, or combination of initiators, selected; the polymerization conditions; the desired molecular weight of the polymer to be produced and the like. The amount is generally expressed in terms of milliequivalents of lithium per 100 grams of monomer. Generally, the quantity employed is that which contains from about 0.05 to 50 milliequivalents of lithium per 100 grams of monomer with a preferred amount of from about 0.1 to 10 milliequivalents of lithium per 100 grams of monomer (meqh.).

The temperatures employed for the polymerization and blending of the allyltin compound are generally in the range of about —100° to 150° C., preferably from about —30° to 120° C. The particular temperature employed depends on the initiator used, the amount of polymerization desired as well as other conditions. The pressure employed during the polymerization need be only that sufficient to maintain the reaction mixtures substantially in the liquid phase.

The polymerization is preferably conducted in the presence of an inert hydrocarbon diluent. Aromatic hydrocarbons, paraffins, or cycloparaffins, containing from 4 to 10 carbon atoms can be suitably employed. Exemplary diluents are benzene, toluene, cyclohexane, methylcyclohexane, xylene, n-butane, n-hexane, n-pentane, n-heptane, isooctane, and mixtures thereof and the like.

The polymerization process can also be conducted in the presence of known additives such as 1,3-dibromobenzene generally in an amount to provide about 0.01 to 5 moles of said additive per mole of haloaryllithium initiator. These additives are known to be processing improving aids for the haloaryllithium initiators.

If desired, polyisoprene or polybutadiene can be produced with the presence, during polymerization, of tetralylyltin (TAT) to improve the processability of the polyisoprene or polybutadiene produced. Generally, from about 0.005 to 5, preferably about 0.025 to about 1.25 millimoles of the TAT are employed per 100 grams of isoprene or butadiene monomer to be polymerized. The TAT is added any time after about 10 percent completion and prior to about 90 percent completion of the polymerization reaction, preferably after 25 percent completion and prior to 80 percent completion.

The products resulting from the polymerization of isoprene or butadiene are generally obtained as solutions which can be treated with various reagents to produce functional groups by replacing the terminal lithium atoms of the polymer molecules resulting from the polymerization itself. For example, polymer in solution can be contacted with carbon dioxide and then with an acid to replace the lithium atoms with —COOH groups. Other functional groups which can be introduced include —SH, —OH, and the like. Alternatively, the unquenched polymer solutions can be treated with an alcohol or other reagent to inactivate the initiator and/or precipitate polymer which is then recovered without functional groups.

The rubbery polymers of isoprene or butadiene produced in accordance with this invention can be compounded by any of the known methods such as have been used in the past for compounding rubbers. Vulcanizing agents, vulcanization accelerators, accelerator activators, reinforcing agents, antioxidants, softeners, plasticizers, fillers, and other compounding ingredients such as have been normally employed in rubbers can likewise be used in the polymers of this invention. The rubbery polymers produced according to this invention have utility in applications where both natural and synthetic rubbers are used. In addition, the rubbery polymers produced by the method of this invention can be blended by any suitable method with other synthetic rubbers and/or natural rubber. For example, they can be used in the manufacture of automobile tires, gaskets, and other rubbery articles.

Illustrative of the foregoing discussion and not to be interpreted as a limitation on the scope thereof, or on the materials therein employed, the following examples are presented:

EXAMPLE I

A haloaryllithium initiator was prepared by reacting 40 millimoles or n-butyllithium and 40 millimoles of 1,3-dibromobenzene in 200 milliliters of toluene. These compounds were charged to an oven-dried nitrogen gas purged reactor and then contacted for 2 hours at 122° F. The yield of initiator which was used to determine the amount of initiator charged to subsequent polymerization reactions was determined in terms of total alkalinity by acid titration of hydrolyzed aliquots using phenolphthalein as the indicator. Normality of the toluene dispersion was thus determined. The foregoing general method was employed to prepare the haloaryllithium initiators used in the following examples.

The 3-bromophenyllithium initiator was then employed for the polymerization of isoprene. The runs were effected lithium. Tetraallyltin modifier was added after about 55% monomer conversion and the reaction was then short-stopped after an additional 65 minutes with isopropanol and stabilized with 1% Cyanox SS.

Final conversion was 93.5%, the percent of 3,4-addition was 5.2%, the cis content was 93% and the inherent viscosity was 3.93. Heterogenity index was 6.4 and no gel was formed.

The polymer recovered from this run was compounded, tested, and compared to a polymer prepared, as a control,

TABLE I

| Run No. | 3-bromo-phenyl-lithium (meqh.) | Percent conv. when TAT added [1] | Final conv., percent | Cis,[2] percent | 3,4-[2] addn., percent | Inh.[3] visc. | Milling observations [4] | Init. torque,[5] m./gm. | Final torque,[5] m./gm. | Drop in torque [5] |
|---|---|---|---|---|---|---|---|---|---|---|
| 1 | 1.3 | 38 | 96 | 80 | 5.6 | 3.77 | Excellent | 1,550 | 1,070 | 480 |
| 2 | 1.3 | 50 | 90 | 93 | 6.4 | 3.95 | do | 1,610 | 1,200 | 410 |
| 3 | 1.3 | 68 | 89 | | | 4.64 | do | 1,610 | 1,330 | 280 |
| 4 | 1.3 | 73 | 89 | 89 | 6.3 | 4.44 | do | 1,590 | 1,240 | 350 |
| 5 | 1.5 | 88 | 88 | 90 | 6.0 | 4.41 | Loose-No Band | 1,460 | 1,420 | 40 |
| 6 | 1.5 | ([6]) | 88 | 89 | 6.5 | 4.49 | do | 1,430 | 1,520 | −90 |

[1] Conversion as estimated from a series of runs without modifier but under like conditions otherwise.
[2] Microstructure was determined as presented in section "A," col. 11 of U.S. Pat. No. 3,215,679.
[3] Inherent viscosity was determined as presented in section "B," col. 11 of U.S. Pat. No. 3,215,679.
[4] Milling observations were made with 50 mg. batches of black stock on a 158° F. mill with 3¾ inch mill guides and 30 mil gauge. The black stocks were made according to the following recipe:

| | Phr. | Brabender charge, gm. |
|---|---|---|
| Polymer | 100 | 34 |
| Philblack-0 [a] | 50 | 17 |
| Philrich-5 [b] | 5 | 1.7 |
| Stearic acid | 3 | 1.0 |

[a] A carbon black.
[b] A highly aromatic oil.

[5] The black recipe of note 4 was made up as follows: The oil and stearic acid were mixed with the black and this mixture was added slowly (2–3 min.) to the polymer while mixing in the Brabender at 25 r.p.m. The 100 mastication was started immediately thereafter and was effected for 6 min. to determine the torque values of this note.
Mastication was in air at 140° C. (This value and the more subjective milling observations provide a good value for processability if inherent viscosity is satisfactory.)
[6] No TAT added.

by charging 40 grams of isoprene to the reactor of each run after that reactor had been washed with cyclohexane, purged for 5 minutes with 3 liters per minute of nitrogen, and charged with cyclohexane diluent. After the monomer had been charged by means of a closed dispenser at 25 pounds per square inch nitrogen pressure, the haloacryllithium initiator was charged by means of a syringe, and the reactor of each run was tumbled at 70° C. After a variable time, tetraallyltin modifier was charged by means of a syringe, and the reactor containing the reaction mixture was tumbled to completion at 70° C. Upon completion of each reaction, the polymer was coagulated with isopropanol and stabilized with one percent Cyanox SS, i.e., 2,2′-methylene-bis-(4-methyl-6-tert-butylphenol). All polymers were found to be gel-free. The polymerization recipe in Table I was employed.

This example demonstrates that excellent processing characteristics and a broad molecular weight distribution can be effected according to the process of this invention, while retaining desirable properties, such as high conversions and high cis content.

| | |
|---|---|
| Isoprene, parts by weight | 100 |
| Cyclohexane, parts by weight | 1000 |
| 3-bromophenyllithium, meqh.[1] | Variable |
| Tetraallyltin (TAT), mhm.[2] | 0.3 |
| Time, hours [3] | 1.5 |

[1] Gram milliequivalents of lithium per 100 grams of monomer.
[2] Gram millimoles per 100 grams of monomer.
[3] Time of total polymerization run.

The results of the isoprene polymerization are presented in Table I.

EXAMPLE II

The polymerization run was made according to the recipe of Example I using 1.2 meqh. of 3-bromophenylin like manner except that no modifier was employed. The following compounding recipe was used:

Compounding recipe

| | Parts by weight |
|---|---|
| Polymer | 100 |
| IRB #2 [1] | 50 |
| Zinc oxide | 3 |
| Stearic acid | 3 |
| Flexamine [2] | 1 |
| Flexzone 3C [3] | 2 |
| Philrich 5 [4] | 5 |
| Vultrol [5] | 1 |
| Sulfur | 2.25 |
| NOBS Special [6] | 0.65 |

[1] Industry Reference Black No. 2 (a high abrasion furnace black).
[2] A physical mixture of a complex diarylamine-ketone reaction produce 65% and N,N′-diphenyl-p-phenylene diamine (35%).
[3] N-isopropyl-N′-phenyl - p - phenylenediamine (Nagugatuck brand of antiozonant and antioxidant).
[4] Highly aromatic oil.
[5] N-nitrosodiphenylamine (scorch retarder).
[6] N-oxydiethylene-2-benzothiazyl sulfenamide.

The processing and physical properties of the compounded polymer are reported in Table II.

TABLE II

| Processing data (7.5 × —"B" Banbury) | Polymer with tetraallyltin modifier | Control |
|---|---|---|
| Mixing time, min. | 5 | 5.25 |
| Band rating (0–10) [1] | 10 | 6 |
| Compounded ML–4 at 212° F | 50 | 66 |
| Extrusions at 250° F., Garvey die: [1] | | |
| In./min | 54 | 72 |
| G./min | 110 | 119 |
| Rating (3–12) [1] | 9 | 7− |

[1] Rating is a modified Garvey die rating on 3 factors as in Table IV.

The above example clearly demonstrates that the polymers produced by the process of this invention have highly improved processing properties.

EXAMPLE III

Isoprene was batch polymerized using the 3-bromophenyllithium initiator. Isoprene, followed by the initiator was added to the single reactor after the addition of diluent and a nitrogen purge. Tetraallyltin modifier if employed, was added at the conversions indicated in Table III. One-hundred parts by weight of isoprene and 1400 parts by weight of diluent were used in the following runs. The data representing these runs are presented in Table III.

TABLE III

| Run | BPL [a] (mhm.) | TAT [b] (mhm.) | Percent conv. when TAT added | Microstructure, percent [c] | | IV [d] |
|---|---|---|---|---|---|---|
| | | | | Cis | 3, 4 | |
| A [e] | .3 | | | 93 | 5 | 11.81 |
| B [e] | .3 | .2 | 0 | 91 | 5 | 4.57 |
| C [f] | .49 | .3 | 30 | 80 | 6 | 3.28 |
| D [f] | 6.13 | .3 | 100 | 84 | 7 | 5.78 |

[a] 3-Bromophenyllithium (gram millimoles per 100 grams of monomer).
[b] Tetraallyltin.
[c] Determined according to U.S. Pat. 3,215,679, col. 11, Note (A).
[d] Inherent viscosity—Determined according to U.S. Pat. No. 3,215,679, col. 11, Note (B).
[e] Cyclohexane diluent.
[f] N-Pentane diluent.

The above polymers were then compounded and the following recipe and the processing data and physical properties of the compounded rubber are reported in Table IV.

Compounding recipe [1]

| | Parts by weight |
|---|---|
| Polymer | 100 |
| IRB #2 | 50 |
| Zinc oxide | 3 |
| Stearic acid | 3 |
| Flexamine | 1 |
| Flexzone 3C | 2 |
| Philrich 5 | 5 |
| Vultrol | 1 |
| Sulfur | 2.25 |
| NOBS Special | 0.65 |

[1] As in Example II.

TABLE IV

Processing data [1]

| Run | A | B | C | D |
|---|---|---|---|---|
| Mixing time, minutes | 10 | 10 | 10 | 10 |
| Band rating [1] | 3 | 6 | 10 | 2 |
| Extrusion rating, Garvey [2] | 7 | 8 | 11 | 5 |

[1] The stocks are banded on a 6 x 12 inch mill at 150° F. and rated from 0 to 4 depending on how and at what gage they band. On the first remill a similar rating is given except the mill temperature is 125° F. Then on the final hand warm milling a rating of 0 to 2 is made. The total rating is then 0 (poor) to 10 (best).
[2] Determined according to U.S. Pat. No. 3,215,679, Col. 12, Note (J), rated as to edge, surface, and corner. Numeral 12 designates an extruded product considered perfectly formed whereas lower numerals indicate less perfect products.

Physical Properties (Cured 30 Min. at 293° F.)

| Run | A | B | C | D |
|---|---|---|---|---|
| 300% modulus, p.s.i. [a] | 1,340 | 1,510 | 1,325 | 1,190 |
| Black tensile, p.s.i. [a] | 3,650 | 3,625 | 3,620 | 3,540 |
| Hot tensile, p.s.i. | 2,240 | 1,980 | 1,890 | 1,630 |

[a] ASTM D412-62T Scott Tensile Machine L-6.

The foregoing example effectively demonstrates the improvements obtained when polyisoprene is prepared according to our invention. Run C represents the only run conducted according to this invention and superior processibility of this polymer is clearly demonstrated by higher values of band rating and extrusion rating with properties being acceptable. Addition of the allyltin compound modifier as part of the initial initiator system failed to produce the improved processible polyisoprene when compared to the polymer produced according to this invention. The retention of good physical properties of polymers produced according to this invention are likewise demonstrated.

EXAMPLE IV

Two 10-gallon reactors designated Reactors A and B, operating in a series were used for two runs in the polymerization of isoprene. The reactors were continuously operated, stirred and liquid full. In both runs the isoprene was charged as a liquid with n-pentane as solvent. The feed was precooled before the addition to Reactor A to aid in the temperature control within the reactor. The 3-bromophenyllithium and dibromobenzene as well as the feed were added to Reactor A so as to continuously provide the quantities of materials desired. The reactor effluent from Reactor A was blended, using an in line mixer, with tetraallyltin (Run E) and tetravinyltin (Run F) as a control, before charging polymerization effluent from Reactor A to Reactor B where the polymerization was continued. The amounts of ingredients employed in these runs, the reaction conditions, and results are reported in Table V.

TABLE V.—POLYMERIZATION RESULTS AND CONDITIONS

| | Parts by weight | |
|---|---|---|
| | Run E | Run F |
| Reactor A: | | |
| N-pentane | 700 | 700 |
| Isoprene | 100 | 100 |
| 3-bromophenyllithium | [1] .05 | [1] .05 |
| Dibromobenzene | .0117 | .0117 |
| Temperature, °C | 72 | 68 |
| Percent conversion in Reactor A | 55.5 | 47.3 |
| IV of polymer from Reactor A | 7.22 | 6.70 |
| Reactor B: | | |
| Temperature, °C | 88 | 87 |
| Tetraallyltin | [1] .085 | |
| Tetravinyltin | | [1] .0685 |
| Total conversion, percent | 86.5 | 75.2 |
| Ratio of percent conversion Reactor A/B | 64/36 | 63/37 |
| IV [2] of polymer produced in Reactor B (calculated) | 1.6 | 4.3 |
| IV [2] of final blended polymer recovered Reactor B | 5.19 | 5.80 |

[1] .3 mhm.
[2] Inherent viscosity determined as in Table III.

The polymers recovered from Runs E and F were compounded according to recipe in Example III. The compounded rubber was then evaluated as to processing attributes and the data are recorded in Table VI.

TABLE VI

Processing Data [1]

| | Run E | Run F |
|---|---|---|
| Extrusion Rating [1] (Garvey Die, at 250° F.) | 10 | 8 |
| In./min | 48 | 54 |
| Gm./min | 102 | 108 |

Processing Data

| | | |
|---|---|---|
| Band Rating | 10 | 4 |
| Raw Mooney ML-4 at 212° F. [2] | 57 | 79 |
| Comp. ML-4 at 212° F. [3] | 53 | 56 |

[1] As in Table IV, Example III.
[2] Determined according to ASTM D1646-63.
[3] Determined according to ASTM D1646-63.

The foregoing example effectively demonstrates that a tailor-made cis-polyisoprene with a controlled ratio of high and low molecular weight fractions can be produced using two continuous reactors operating in a series by feeding isoprene, solvent, and 3-bromophenyllithium initiators to the first reactor and therein manipulating the ratio of catalyst to monomer to control the molecular weight of the polymer fraction produced therein manipulating the temperature in the first reaction to control the monomer conversion and thereby the amount of the first polymer fraction and subsequently blending to the first reactor effluent tetraallyltin modifier of this invention and then passing the blend to the second reactor wherein polymerization is continued and wherein the molecular weight of the polymer fraction is similarly controlled to produce an improved processible polyisoprene.

EXAMPLE V

Polyisoprene was prepared as in Example IV using two 10-gallon reactors operating in a series with 1 hour residence time per reactor. The quantities of all ingredients employed were identical to Run A of that example except that the level of 3-bromophenyllithium was 0.27 mhm. The temperature in the first reactor was maintained between 72° and 77° C. and the temperature in the second reactor between 84° and 86° C. Tetraallyltin modifier was added to the polymerization effluent from the first reactor after about 55% conversion as in Example IV. The final polymer blend was composed of about 91% of the cis addition product. The polymer was compounded into the following rubber formulations and was tested with Natsyn 400 as a control.

| Run | Compounding Recipe (Parts by Weight) | | | |
|---|---|---|---|---|
| | W | X | Y | Z (Control—Natsyn 400)[1] |
| Polymer | 100 | 100 | 100 | 100 |
| IRB # 2 [2] | 50 | 50 | | |
| Philback N 347 *[3] | | | 50 | 50 |
| Zinc Oxide | 3 | 3 | 3 | 3 |
| Stearic acid | 3 | 3 | 3 | 3 |
| Flexamine [2] | 1 | 1 | 1 | 1 |
| Flexzone 3C [2] | 2 | 2 | 2 | 2 |
| Philrich 5 *[2] | 5 | 5 | 5 | 5 |
| Vultrol [2] | 1 | 1 | 1 | 1 |
| Sulfur | 2.25 | 2.5 | 2.25 | 2.25 |
| NOBS Special [2] | 0.65 | 0.75 | 0.65 | 0.65 |

[1] Commercial high cis-polyisoprene (Goodyear Tire and Rubber).
[2] As in Example II.
[3] High abrasion furnace black.
* Trademark.

Table VII presents the processing data and the physical properties of the various polymer formulations. Each of these rubbers was then tested to determine their relative wear characteristics when incorporated into a tire. Sectional tires were prepared by mixing the stocks in a 1-A Banbury mixer and the tread extruded through a 4½ inch NRM extruder. The retread tires were tested on a Ford stationwagon operating between Bartlesville, Okla., and Borger, Tex., for approximately 10,000 miles. The following test conditions were employed.

Speed _____ 50 to 70 m.p.h.
Load _____ 1200 lbs./tire (approx.).
Rim _____ 6 inches.
Rotation, right vertical _____ 8.

TABLE VII

Processing Data (76X—1A Banbury)

| Run | W | X | Y | Z |
|---|---|---|---|---|
| Mixing time, min | 4'55" | 5'05" | 4'05" | 4'40" |
| Dump temp., °F | 295 | 295 | 300 | 310 |
| Band rating (0–10) | 10 | 10 | 8 | 6 |
| Compounded ML-4 at 212° F | 52 | 53 | 64 | 69 |
| Scorch at 280° F., Δ5, min | 12.2 | 11.3 | 10.9 | 10.8 |
| Extrusions at 250° F., Garvey Die: | | | | |
| In./min | 44 | 43 | 48 | 56 |
| G./min | 101 | 106 | 107 | 114 |
| Rating (3–12) | 11 | 12− | 11+ | 10+ |

Physical Properties (Cured 30 Min. at 293° F.)

| | | | | |
|---|---|---|---|---|
| $\nu \times 10$, Moles/cc [2] | 1.49 | 1.76 | 1.74 | 1.77 |
| 300% Modulus, p.s.i.[1] | 1,190 | 1,500 | 1,650 | 1,975 |
| Tensile, p.s.i.[1] | 3,840 | 3,735 | 3,740 | 4,210 |
| Elongation, percent [1] | 665 | 580 | 585 | 550 |
| Max. Tensile at 200° F., p.s.i.[1] | 2,160 | 1,800 | 2,490 | 2,770 |
| ΔT, °F.[1] | 41.8 | 38.4 | 42.6 | 41.3 |
| Resilience, percent [1] | 72.4 | 73.8 | 72.3 | 73.1 |
| Shore A Hardness [1] | 54 | 56 | 58 | 59 |

Aged 24 Hours at 212° F.

| | | | | |
|---|---|---|---|---|
| 300% modulus, p.s.i.[1] | 1,900 | 2,250 | 2,350 | 2,470 |
| Tensile, p.s.i.[1] | 2,770 | 2,580 | 2,930 | 3,480 |
| Elongation, percent [1] | 400 | 340 | 370 | 410 |
| ΔT, °F.[1] | 40.8 | 39.9 | 42.3 | 43.2 |
| Resilience, percent [1] | 75.0 | 74.7 | 76.6 | 74.1 |

[1] As in Example III.
[2] As determined in U.S. Pat. No. 3,215,679, col. 11, Note D.

The results of the tire tests indicated that the polymers of this invention rated satisfactorily as to chipping and tread wear. The polymers of this invention rated better than the control as to cracking resistance.

The above example demonstrates that the polymers produced according to this invention exhibit higher mill band and extrusion ratings than the control formulation. Polymers of this invention not only exhibited excellent processing characteristics but also satisfactorily compared with the control polymer as to physical properties.

As will be evident to those skilled in the art, various modifications of this invention can be made or followed in light of the discussion and disclosure herein set forth without departing from the scope and spirit thereof.

We claim:

1. A process for improving the processability of an isoprene or butadiene polymer comprising polymerizing isoprene or butadiene in the presence of a haloaryllithium polymerization initiator and admixing to the polymerization system an allyltin compound in an amount to provide from about .005 to 5.0 gram millimoles of said allyltin compound per 100 grams of monomer charged to said polymerization system wherein said admixing of said allyltin compound is made only after at least 25 percent and prior to about 80 percent conversion of monomer to polymer and the percentage of polymerization permitted after the addition of said allyl tin compound is at least about 5 percent conversion of monomer, wherein said allyltin compound can be represented by the following formula:

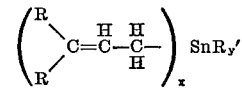

wherein $x$ is an integer from 1 to 4, wherein the sum of $y$ and $x$ equals 4, where R is hydrogen or an alkyl or cycloalkyl hydrocarbon radical containing 1 to 6 carbon atoms, wherein R' is an alkyl, cycloalkyl, or aryl hydrocarbon radical containing 1 to 25 carbon atoms; wherein said haloaryllithium polymerization initiator can be represented by any one of the following formulas:

(a)

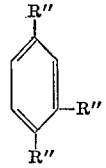

(b)

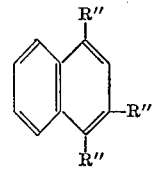

wherein each R" is hydrogen, lithium, or a halogen, said halogen selected from fluorine, bromine, or chlorine, and wherein each R" is different from each other R" and only one R" is a halogen or (c) mixtures of initiators represented by formulas (a) and (b).

2. The process of claim 1 wherein the amount of said haloaryllithium polymerization initiator employed is sufficient to provide in the range of about 0.05 to 50 gram milliequivalents of lithium per 100 grams of monomer; and wherein the temperature employed in said polymerization system is generally in the range of about −100 to 150° C.

3. The process of claim 2 wherein the amount of said haloaryllithium polymerization initiator is sufficient to provide in the range of about 0.1 to 10 gram milliequivalents of lithium per 100 grams of monomer; wherein said allyltin compound is provided in an amount from about .025 to 1.25 gram millimole per 100 grams of monomer charged to the polymerization system; and wherein said R' radical of said allyltin compound is an aryl hydrocarbon radical.

4. The process of claim 3 wherein said haloaryllithium initiator is 3-bromophenyllithium and said allyltin compound is tetraallyltin.

5. The process of claim 4 which further includes treating in solution the resulting product produced from the polymerization of isoprene or butadiene with various reagents to produce functional groups thereon by replacing the terminal lithium atoms of the polymer molecules resulting from the polymerization itself.

6. The process of claim 5 wherein said functional groups are —SH, —OH, —COOH.

7. The process of claim 2 wherein said polymerization is conducted in a series of reactors wherein the percentage of polymerization permitted in the first reactor is within the range of about 25 to 80 percent of the isoprene or butadiene conversion to polymer; wherein the reaction mixture in the first reactor is removed and said admixing step performed; and wherein said polymerization is continued in a second reactor in series with said first reactor to produce a blend of polymers with high and low molecular weight fractions.

8. A process for polymerizing isoprene to a polymer possessing improved processability comprising contacting said isoprene with 3-, or 4-bromophenyllithium initiator, said initiator present in an amount to provide from about 0.05 to about 50 milliequivalents of lithium per 100 grams of isoprene, and admixing to the polymerization system tetrallyltin in an amount to provide from about 0.025 to about 1.25 millimoles of tetraallyltin per 100 grams of isoprene charged wherein said admixing of said tetrallyltin is made only after at least 25 percent and prior to about 80 percent conversion of monomer to polymer and the percentage of polymerization permitted after the addition of said allyltin compound is at least about 5 percent conversion of monomer.

9. The process of claim 8 wherein said initiator is 3-bromophenyllithium.

References Cited
UNITED STATES PATENTS 3,450,685  6/1969  Trepka et al. _____ 260—94.2

JOSEPH L. SCHOFER, Primary Examiner

W. F. HAMROCK, Assistant Examiner

U.S. Cl. X.R.

260—94.3, 94.7